(12) United States Patent
Mclean, Jr. et al.

(10) Patent No.: US 10,251,045 B2
(45) Date of Patent: Apr. 2, 2019

(54) SATLINK CONVERTOR/COMMUNICATOR

(71) Applicants: James Edward Mclean, Jr., Charlotte, NC (US); Edward D. Mclean, San Marcos, TX (US)

(72) Inventors: James Edward Mclean, Jr., Charlotte, NC (US); Edward D. Mclean, San Marcos, TX (US)

(73) Assignee: Mcleanics Technology Corporation, Charlotte, NC (US)

( * ) Notice: Subject to any disclaimer, the term of this patent is extended or adjusted under 35 U.S.C. 154(b) by 0 days.

(21) Appl. No.: 14/756,723

(22) Filed: Oct. 5, 2015

(65) Prior Publication Data

US 2017/0099593 A1 Apr. 6, 2017

(51) Int. Cl.
| | | |
|---|---|---|
| H04M 1/04 | (2006.01) | |
| H04W 4/02 | (2018.01) | |
| H04W 4/90 | (2018.01) | |
| H04M 1/725 | (2006.01) | |
| H04W 84/06 | (2009.01) | |

(52) U.S. Cl.
CPC .......... *H04W 4/90* (2018.02); *H04M 1/72527* (2013.01); *H04W 4/026* (2013.01); *H04M 1/04* (2013.01); *H04W 84/06* (2013.01)

(58) Field of Classification Search
CPC ....... H04W 4/22; H04W 4/026; H04W 84/06; H04W 88/06; H04M 1/06
USPC ... 455/3.02, 404.2, 412.1–414.2, 418–422.1, 455/427–431, 456.1, 456.2, 456.3, 455/456.5–457, 12.1, 525, 67.11, 550.1, 455/552.1, 561, 98; 370/317–322, 328, 370/341
See application file for complete search history.

(56) References Cited

U.S. PATENT DOCUMENTS

| | | | | |
|---|---|---|---|---|
| 5,020,090 A | * | 5/1991 | Morris | G06F 1/1616 361/679.41 |
| 5,625,877 A | * | 4/1997 | Dunn | H04W 72/0406 370/329 |
| 5,903,835 A | * | 5/1999 | Dent | H04B 1/3877 370/280 |
| 6,058,338 A | * | 5/2000 | Agashe | G01S 19/05 244/158.8 |
| 6,061,579 A | * | 5/2000 | Arai | H01Q 1/084 455/347 |

(Continued)

*Primary Examiner* — Babar Sarwar (57) ABSTRACT

The Satlink Convertor/Communicator (SCC), is a device that converts a regular cell phone, smart phone, tablet, laptop, computer, or any other remote communication device, into a satellite phone or emergency beacon. This is accomplished by inserting the SCC's usb connector into the usb port of the remote communication device; other connector types may be used as well. Once the SCC is connected to the remote communication device, the user may place a satellite phone call, trigger an emergency beacon, access the internet, send and receive emails and text messages etc. In the event of an emergency, and the user triggers the SCC's emergency beacon, the SCC will transmit the GPS coordinates (Latitude and Longitude) of the user, via satellite, to a monitoring service. Further, the SCC can be interfaced to a Base Unit installed within a vehicle, boat, home, or business, to enable the SCC to be operated within these enclosed/covered locations, which normally restricts satellite signals and communications.

15 Claims, 12 Drawing Sheets

3D VIEW OF THE SCC

(56) References Cited

U.S. PATENT DOCUMENTS

| | | | | |
|---|---|---|---|---|
| 6,085,090 A * | 7/2000 | Yee | G01S 5/0027 | 342/450 |
| 6,246,688 B1 * | 6/2001 | Angwin | H04L 12/2856 | 370/392 |
| 6,289,213 B1 * | 9/2001 | Flint | H04M 1/725 | 455/420 |
| 6,363,247 B1 * | 3/2002 | Gum | H04M 11/04 | 455/404.1 |
| 6,546,262 B1 * | 4/2003 | Freadman | H04M 1/274525 | 455/413 |
| 6,564,274 B1 * | 5/2003 | Heath | G06F 13/40 | 333/236 |
| 6,636,750 B1 * | 10/2003 | Zurek | H04M 1/6041 | 379/388.01 |
| 6,754,451 B1 * | 6/2004 | Nakamura | H04B 10/1143 | 398/135 |
| 6,909,907 B1 * | 6/2005 | Oyang | G01C 21/26 | 342/357.75 |
| 7,549,007 B1 * | 6/2009 | Smith | G06F 1/1616 | 455/418 |
| 7,996,045 B1 * | 8/2011 | Bauer | G06F 3/0488 | 455/466 |
| 8,005,366 B2 * | 8/2011 | Shin | H04B 10/116 | 398/129 |
| 8,213,971 B2 * | 7/2012 | Papineau | G06F 8/60 | 455/466 |
| 8,447,226 B1 * | 5/2013 | Kuether | H04B 7/18517 | 455/3.02 |
| 8,538,269 B2 * | 9/2013 | Blanton | H04Q 9/00 | 398/115 |
| 8,751,039 B1 * | 6/2014 | Macoviak | A61J 7/0076 | 700/244 |
| 8,842,429 B2 * | 9/2014 | Ahn | G06F 1/1616 | 361/679.41 |
| 8,886,811 B2 * | 11/2014 | Gindentuller | H04M 1/72561 | 709/227 |
| 8,892,876 B1 * | 11/2014 | Huang | G06F 21/6209 | 713/165 |
| 8,930,605 B2 * | 1/2015 | Bosse | G06F 1/1632 | 710/303 |
| 8,954,004 B1 * | 2/2015 | Wang | G06F 21/43 | 455/41.1 |
| 2002/0013162 A1 * | 1/2002 | Whitney | H04M 1/253 | 455/557 |
| 2003/0054858 A1 * | 3/2003 | Yambe | H04W 88/02 | 455/557 |
| 2003/0171097 A1 * | 9/2003 | Soejima | H04B 7/18517 | 455/12.1 |
| 2004/0044911 A1 * | 3/2004 | Takada | G01S 5/0027 | 713/170 |
| 2004/0072583 A1 * | 4/2004 | Weng | G08B 25/016 | 455/456.3 |
| 2004/0185774 A1 * | 9/2004 | Scott | H04B 7/18523 | 455/11.1 |
| 2004/0192338 A1 * | 9/2004 | Bacon | H04M 1/725 | 455/456.1 |
| 2005/0076088 A1 * | 4/2005 | Kee | G06F 1/1616 | 709/206 |
| 2005/0137942 A1 * | 6/2005 | LaFleur | G06Q 30/0601 | 705/26.1 |
| 2005/0148346 A1 * | 7/2005 | Maloney | G01S 19/09 | 455/456.6 |
| 2005/0164752 A1 * | 7/2005 | Lau | G06F 1/1616 | 455/575.3 |
| 2005/0185364 A1 * | 8/2005 | Bell | G06F 1/1632 | 361/679.41 |
| 2005/0205278 A1 * | 9/2005 | Maruyama | H01R 13/465 | 174/33 |
| 2005/0221841 A1 * | 10/2005 | Piccionelli | H04W 48/04 | 455/456.3 |
| 2005/0282492 A1 * | 12/2005 | Lopez | H04W 84/14 | 455/12.1 |
| 2007/0178852 A1 * | 8/2007 | Young | G06F 1/1616 | 455/90.3 |
| 2008/0002355 A1 * | 1/2008 | Carnevali | G06F 1/1632 | 361/679.41 |
| 2009/0082890 A1 * | 3/2009 | Griffin, Jr. | H04M 1/6091 | 700/94 |
| 2010/0234051 A1 * | 9/2010 | Holden | H04B 1/3805 | 455/466 |
| 2010/0304792 A1 * | 12/2010 | Li | H04B 1/3877 | 455/566 |
| 2010/0332315 A1 * | 12/2010 | Kamar | G06Q 30/02 | 705/14.46 |
| 2011/0063105 A1 * | 3/2011 | Bennett | A61B 5/0022 | 340/539.11 |
| 2011/0185048 A1 * | 7/2011 | Yew | H04M 1/72527 | 709/221 |
| 2012/0136991 A1 * | 5/2012 | Gindentuller | G06F 17/30902 | 709/224 |
| 2012/0210034 A1 * | 8/2012 | Ko | G06F 1/1632 | 710/303 |
| 2013/0053095 A1 * | 2/2013 | Buckle | H04W 88/06 | 455/552.1 |
| 2013/0127737 A1 * | 5/2013 | Shneidman | G06F 3/041 | 345/173 |
| 2014/0203932 A1 * | 7/2014 | Turner | G08B 25/016 | 340/539.13 |
| 2015/0277503 A1 * | 10/2015 | Eremenko | G06F 1/1658 | 361/679.4 |
| 2016/0110865 A1 * | 4/2016 | Alvarez Guerras | G06F 19/00 | 600/485 |
| 2016/0192163 A1 * | 6/2016 | Miner | H04W 4/90 | 455/404.1 |
| 2016/0381657 A1 * | 12/2016 | Blanchard | H04W 8/183 | 455/427 |
| 2017/0006620 A1 * | 1/2017 | Reis | H04L 43/16 | |
| 2017/0099593 A1 * | 4/2017 | Mclean, Jr. | H04W 4/90 | |

\* cited by examiner

3D VIEW OF THE SCC

LEFT SIDE VIEW

Figure 3

RIGHT SIDE VIEW

FRONT VIEW

PICTORIAL DIAGRAM OF THE BASE UNIT

Figure 10

3D VIEW OF THE PCI CARD VERSION
(Installed inside a computer)

Figure 11

3D VIEW OF THE CRADLE VERSION

Figure 12

SATLINK CONVERTOR/COMMUNICATOR

CROSS REFERENCE TO RELATED APPLICATION

None Applicable

STATEMENT REGARDING FEDERAL SPONSORED RESEARCH

None Applicable

REFERENCE TO SEQUENCE LISTING, A TABLE, OR A COMPUTER PROGRAM LISTING COMPACT DISC APPENDIX

None Applicable

BACKGROUND OF INVENTION

The Satlink Convertor/Communicator (SCC), is in the field of mobile communications. AS of today, we have cell phone, tablets, smart phones, laptops, computers, and other remote communication devices, that utilize some form of wireless communication means, such as, Blue Tooth, WiFi, Cell Towers, etc. However, none of these devices have the capacity to convert and use satellite communication as an alternative wireless communication means. Further, all of these devices are limited to a certain signal range, such as, the range of a cell tower, or the hot spot of a WiFi location. These devices become useless in remote areas, such as, offshore oceans, mountains, and deserts. Therefore, a person cruising the oceans, hiking the mountains, or traveling through a desert area, may be without reliable communication in the event of an emergency or communication need.

BRIEF SUMMARY OF INVENTION

The Satlink Convertor/Communicator (SCC), is a device that converts a regular cell phone, smart phone, tablet, laptop, computer, or any other remote communication device, into a satellite phone or emergency beacon. This is accomplished by inserting the SCC's usb connector into the usb port of the remote communication device; other connector types may be used as well. Once the SCC is connected to the remote communication device, the remote communication device can now transmit and receive communication signals via satellite. The user may place a satellite phone call, access the internet, send and receive emails and text messages, etc.; or in the event of an emergency, the user can trigger an emergency beacon to summon help. Once the emergency beacon is triggered, the SCC will transmit the GPS coordinates (Latitude and Longitude) of the user, via satellite, to a monitoring service. Further, the SCC can be interfaced to a base unit installed within a vehicle, boat, home, or business (fixed location). The base unit interface enables the SCC to be used inside of a vehicle, boat, home, or business, which normally restricts the use of satellite communications.

BRIEF DESCRIPTION OF THE SEVERAL VIEWS OF THE DRAWINGS

FIG. 1, is the 3D view of the Invention. This figure depicts the portable version of the SCC (invention). This portable version of the SCC is an electronic device or circuit that is enclosed or housed in an enclosure of some type so as to protect the electronic circuitry. A connection means such as, a USB connector is extended from the internal circuitry to the exterior of the enclosure to permit connectivity to a port of a remote communication device such as, a smart phone. A Satellite Antenna means is also extended from the internal circuitry to the exterior of the enclosure to permit maximum transmission and reception of satellite signals; the antenna may be enclosed within the enclosure or housing, however, signal strength may be reduced. A recessed Manual Beacon Button is also extended from the internal circuitry to the exterior of the enclosure, this button is use to manually trigger an emergency beacon. Once pressed, the latitude and longitude of the SCC or the connected remote communication device will be transmitted to a monitoring service to summon help.

FIG. 2. is the Connectivity view of the Invention. This figure depicts connectivity of the portable SCC device to a remote communication device, (i.e. a smart phone). The portable SCC device is being connected to the smart phone by inserting the portable SCC's USB connector into the USB port of the smart phone. Once connected, the smart phone will be converted into a satellite smart phone; and, the portable SCC will enable the smart phone to transmit and receive signals via satellites and cell towers, which will enable the smart phone to have two selectable primary communication means. The two selectable primary communication means are controlled by software, utility files, or drivers, which will enable a user to manually select between the two primary communication means or the software will automatically select one of the two primary communication means base upon signal, strength or loss of one of the signals.

FIG. 3, is the Left Side view of the Invention. This figure depicts the portable SCC from its left side, it shows the USB Connector extending to the exterior of the enclosure to enable the SCC's internal circuitry to be connected to a remote communication device by inserting the USB Connector into the USB port of the remote communication device, (i.e. a cell phone, or smart phone, etc.). Also, the Satellite Antenna is depicted as extended to the exterior the enclosure.

FIG. 4, is the Right Side view of the Invention. This figure depicts the portable SCC from its right side, it shows the USB Connector extending to the exterior of the enclosure to enable the SCC's internal circuitry to be connected to a remote communication device by inserting the USB Connector into the USB port of the remote communication device, (i.e. a tablet, or laptop, etc.). Also, the Satellite Antenna is depicted as extended to the exterior the enclosure.

FIG. 5, is the Top and Bottom view of the Invention. This figure depicts the portable SCC from its top and bottom, it shows the USB Connector extending to the exterior of the enclosure to enable the SCC's internal circuitry to be connected to a remote communication device by inserting the USB Connector into the USB port of the remote communication device, (i.e. Two way radio, or Marine VHF/UHF radio, etc.). Also, the Satellite Antenna is depicted as extended to the exterior the enclosure.

FIG. 6, is the Front view of the Invention. This figure depicts the portable SCC from its front. A small display means of some type is fixed to the front of the enclosure so as to show or display the SCC's signal strength in the form of Signal Bars or some other method. The display means' circuitry is internal the enclosure. Also, the Satellite Antenna is depicted as extended to the exterior of the enclosure with the potential of being rotated for best signal strength.

FIG. 7, is the Back view of the Invention. This figure depicts the back view of the portable SCC, it shows the USB Connector extending to the exterior of the enclosure to enable the SCC's internal circuitry to be connected to a remote communication device by inserting the USB Connector into the USB port of the remote communication device, (i.e. a computer, or wearable communication device, etc.). Also, the Satellite Antenna is depicted as extended to the exterior of the enclosure and pointing upwards. Further, the Manual Beacon Button is depicted as extending external of the enclosure to permit easy access to a user for triggering the beacon in the event of an emergency situation.

FIG. 8, is the Pictorial Diagram of the Invention. This figure depicts the portable SCC attaching to a remote communication device, (i.e. a Smart Phone), and transmitting and receiving satellite signals to an orbiting Satellite, which in turn transmits and receives satellite signals to a Monitoring Service/Earth Station and Communication Service Provider. The transmitted/received satellite signals may consist of an email, phone call, file upload or download, Internet surf, etc.

FIG. 9, is the Schematic Diagram of the Invention. This figure depicts a partial circuit function of the portable SCC. The USB Connector is shown to extend exterior the enclosure to permit connection of a remote communication device. Once connection is made to a remote communication device, communication signals are introduced to the SCC's circuitry which will consist of a Microprecessor, (other integrated circuits will exist such as, a USB controller, but are not depicted). The Microprocessor will control the signal flow (transmission or reception) by means of a Microprocessor controlled switch. The Microprocessor will also pass the signal to a Digital to Analog Convertor circuit, which will transform the signal from a digital format to an analog format in preparation for transmission, then pass the signal to the Transmitter circuit where it is queued for transmission. The Antenna, which is shown to extend to the exterior of the enclosure, is used to facilitate the propagation of the signal waves to a satellite or cell tower. When a signal is received through the Antenna, the signal will enter the Receiver circuit, then it will be passed on to the Analog to Digital circuit, which will transform the signal from an analog format to a digital format. Once the signal is transformed to a digital signal format, it will be passed to the Microprocessor, which in turn will pass the signal on to the remote communication device. Other circuit configurations may be used to achieve the functions of converting the remote communication device into a satellite accessible remote communication device, and adding two selectable primary communication means to said remote communication device, (e.g. in the case of a purely digital communication system, other circuit configurations may be used to achieve the end results stated herein).

FIG. 10, is the Pictorial Diagram of the Base Unit of the Invention; which is installed within a vehicle, boat, home, or business. This figure depicts the Base Unit 3D view and its means. The Base Unit is a SCC as well, designed specifically for fixed, closed, or covered locations, (i.e. a vehicle, boat, home, or business), it will enable the portable SCC to be linked to it by a cable or wireless means (i.e. Blue Tooth, WiFi, or other types of wireless means or protocols); or a remote communication device can be directly linked to the Base Unit SCC, if the remote communication device is equipped with a wireless means or protocol, or a cable connector means (e.g. a USB connector, etc.). Once the portable SCC is connected to a remote communication device and linked to the Base Unit SCC, or the remote communication device is directly linked to the Base Unit SCC, the remote communication device will be able to operate within fixed, closed, or covered locations; and to transmit and receive satellite communication signals; and to transmit and receive signals by two selectable primary communication means. The Base Unit SCC accomplishes this by means of its Outside Mounted Antenna for a Home or Business, or by means of its Windshield/Windowpane Antenna Attachment for a Car or Boat, or by means of its External Dome Antenna Attachment for a Car or Boat. These specially mounted antennas will permit satellite signals to be transmitted and received without obstructions by covered locations, and other antenna means/designs can be used as well.

FIG. 11, is the 3D view of the PCI card version of the Invention, that is installed on the main board of a computer. This figure depicts an example of the SCC as a Circuit in the form of a PCI Card For Computer Installation. This PCI Card SCC is incorporated within a computer. Once the PCI Card SCC is incorporated within a computer, it will enable the computer to transmit and receive satellite communication signals; and to transmit and receive via two selectable primary communication means, (i.e. cell towers and satellites). The PCI Card SCC is also equipped with a Coaxial Antenna Output Connector fnr attachment to an external antenna means, other types of connector means may be permitted as well. The PCI Card SCC's circuitry, instead of being in a card format as depicted in the figure, may also be a circuit which is embedded within the actual circuitry of the main board of the computer, or other remote communication devices, which will eliminate the need for installation.

DETAILED DESCRIPTION OF THE INVENTION

Figure 1:
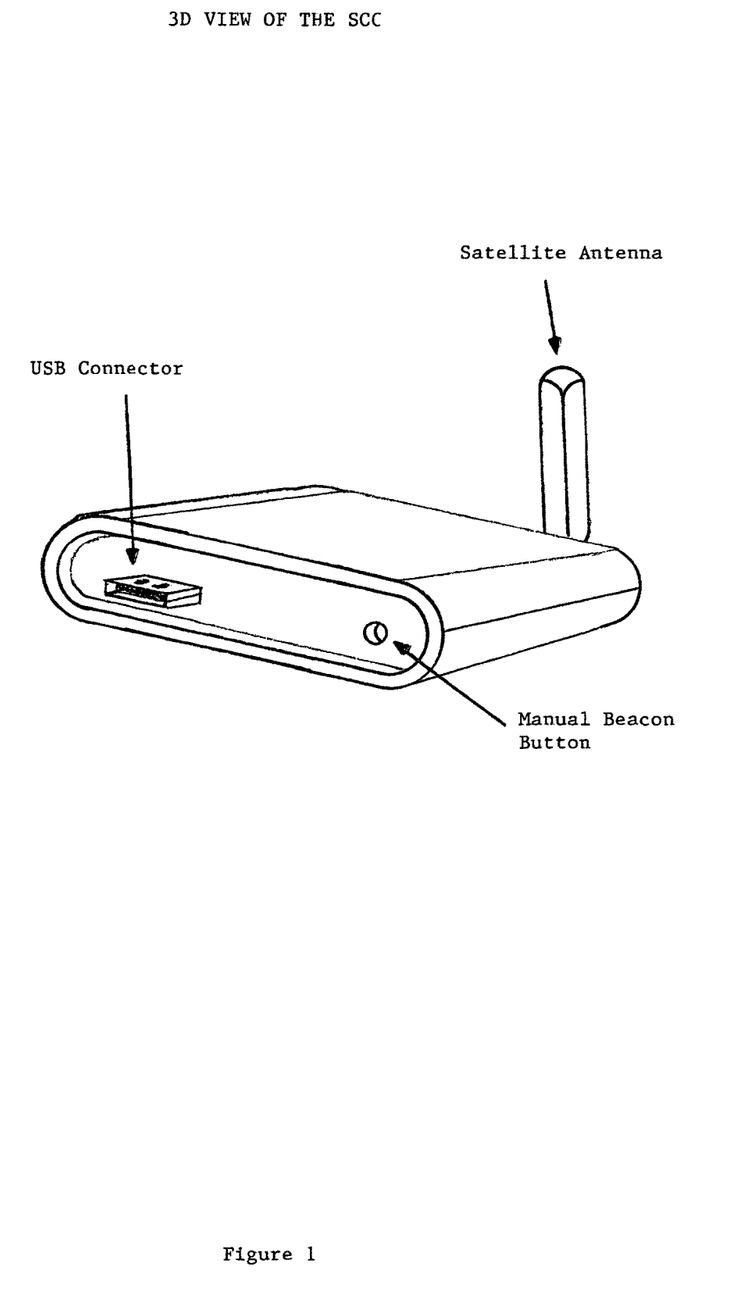
Figure 2:
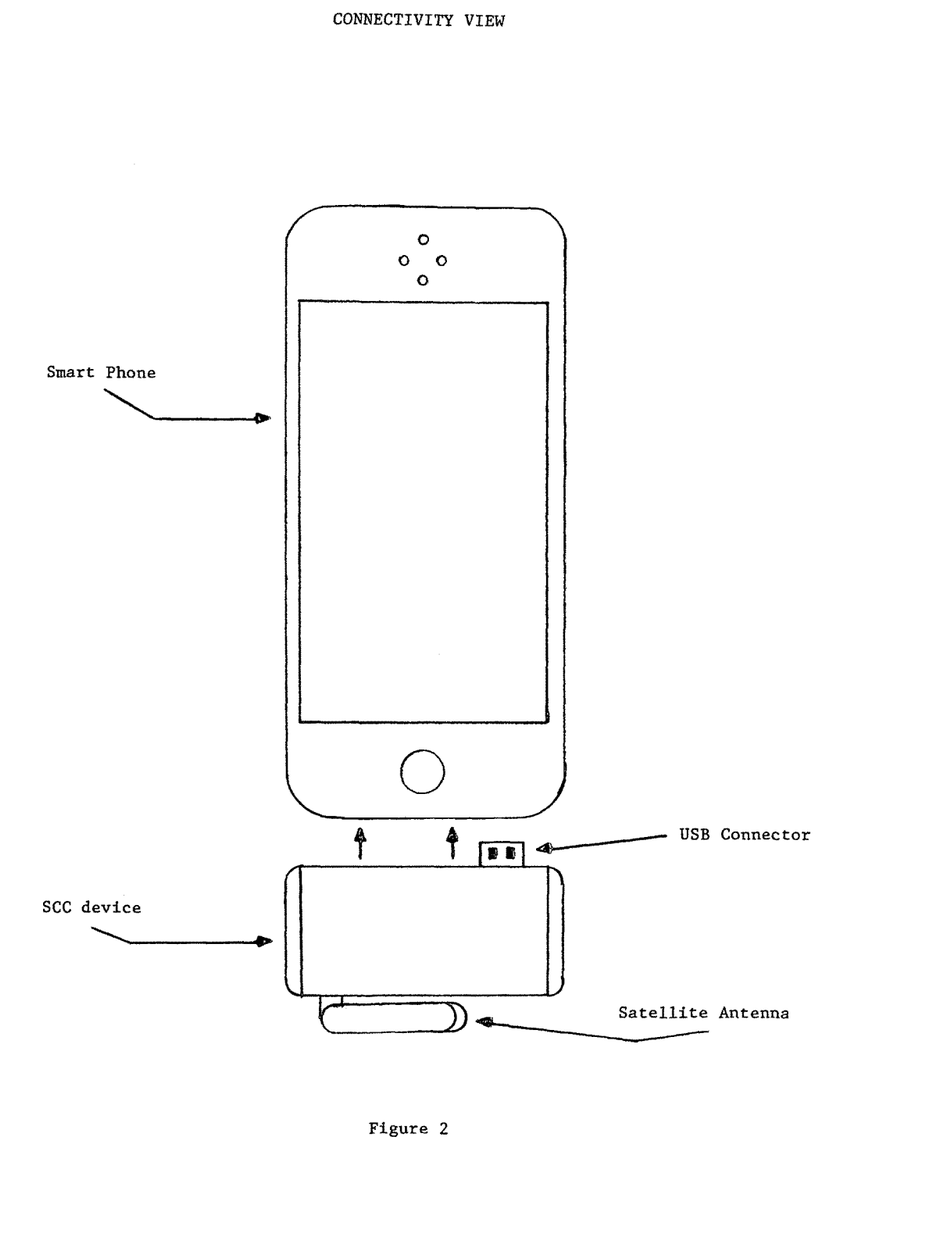
Figure 3:
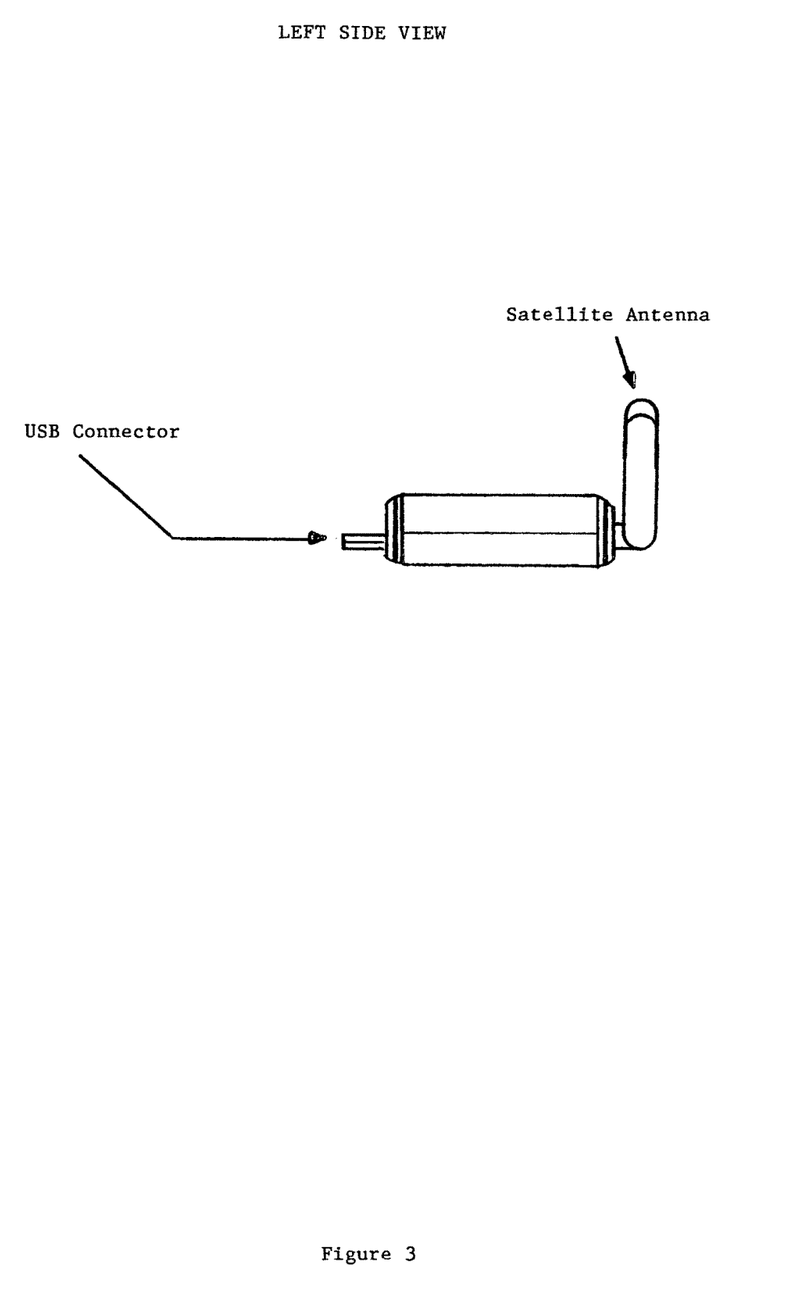
Figure 4:
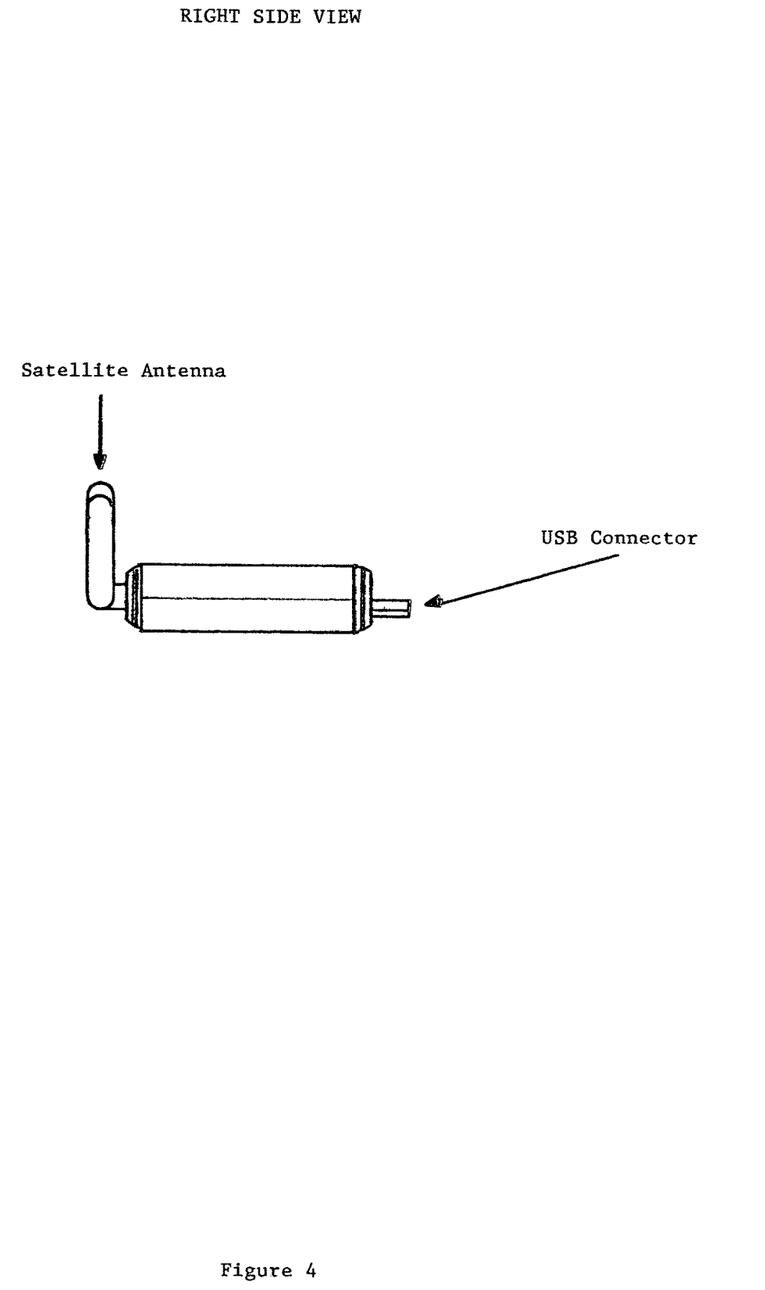
Figure 5:
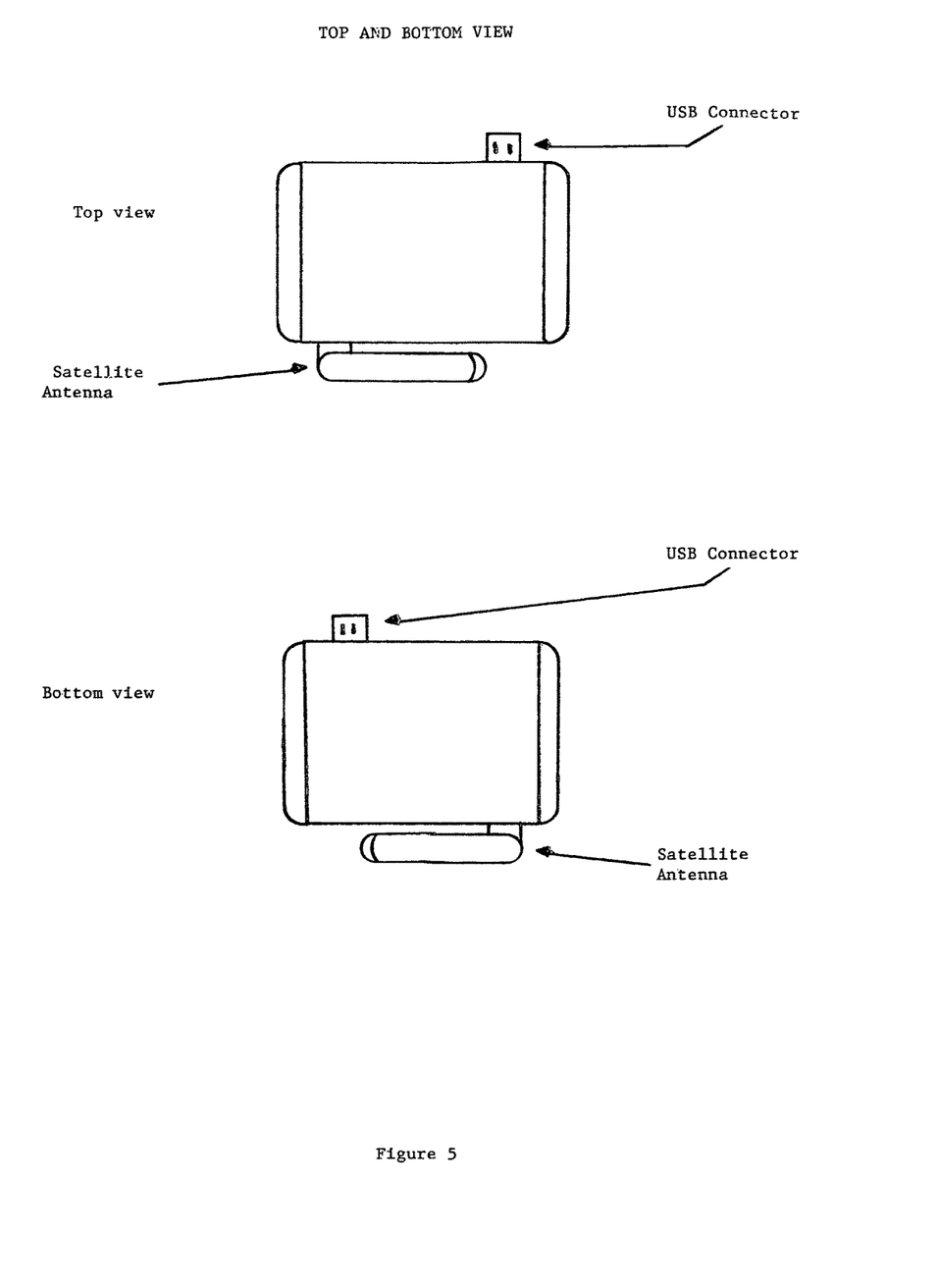
Figure 6:
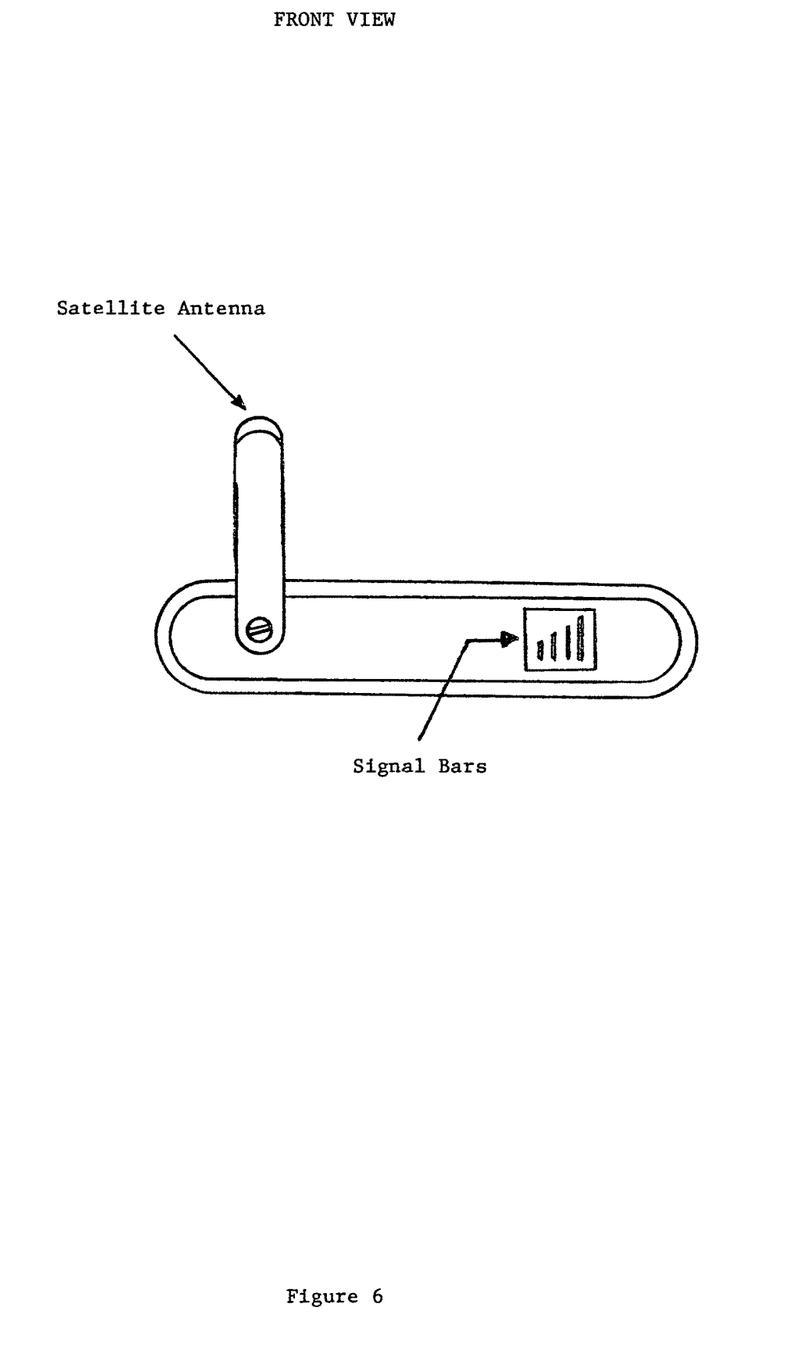
Figure 7:
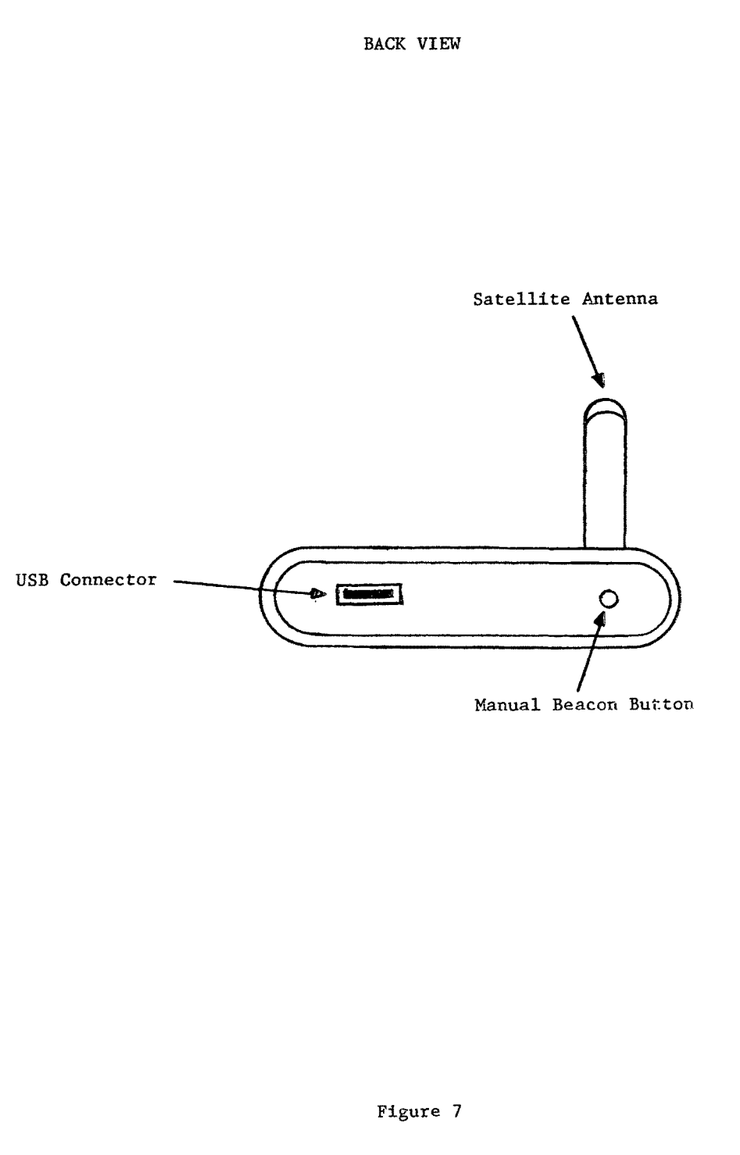
Figure 8:
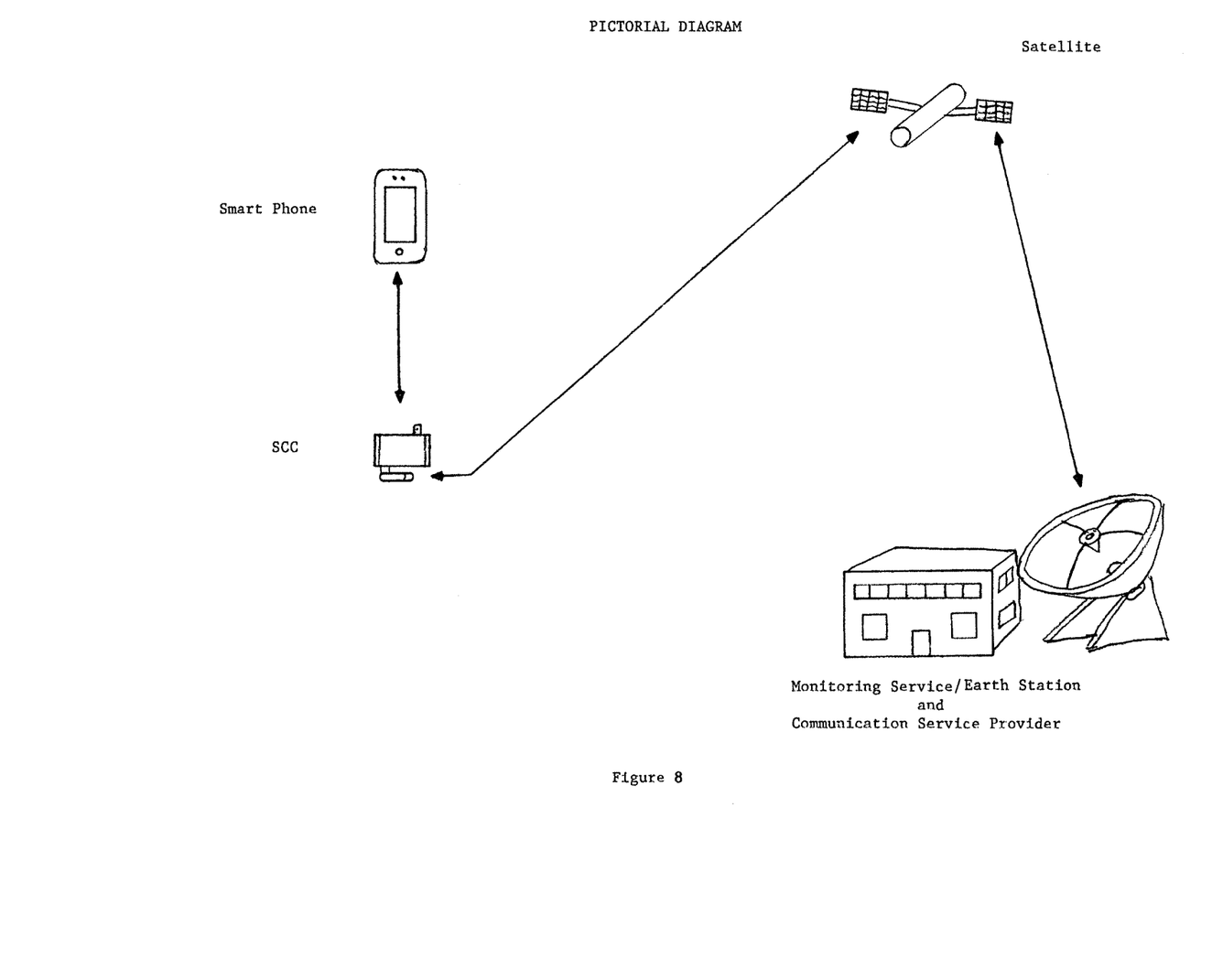
Figure 9:
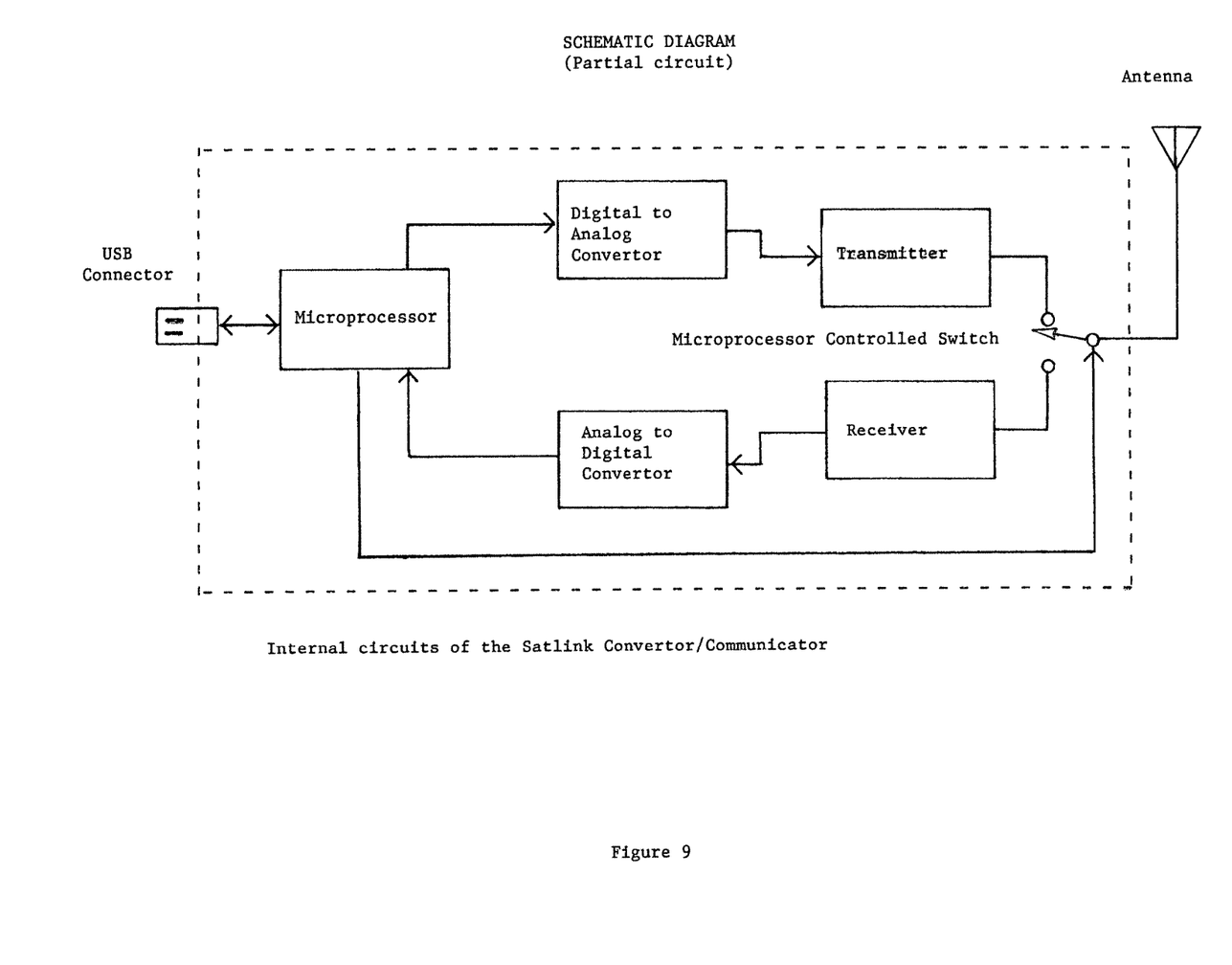
Figure 10:
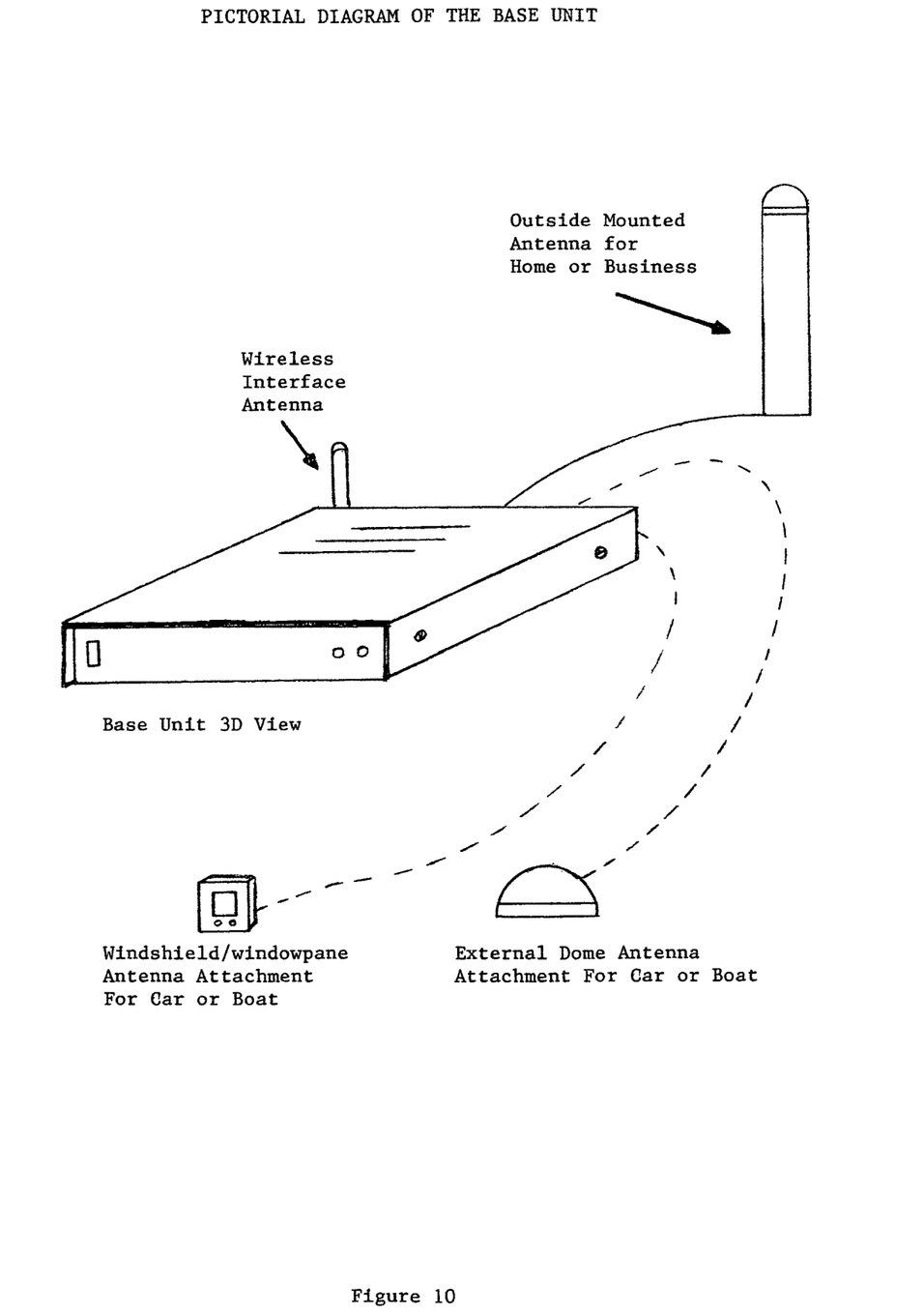
Figure 11:
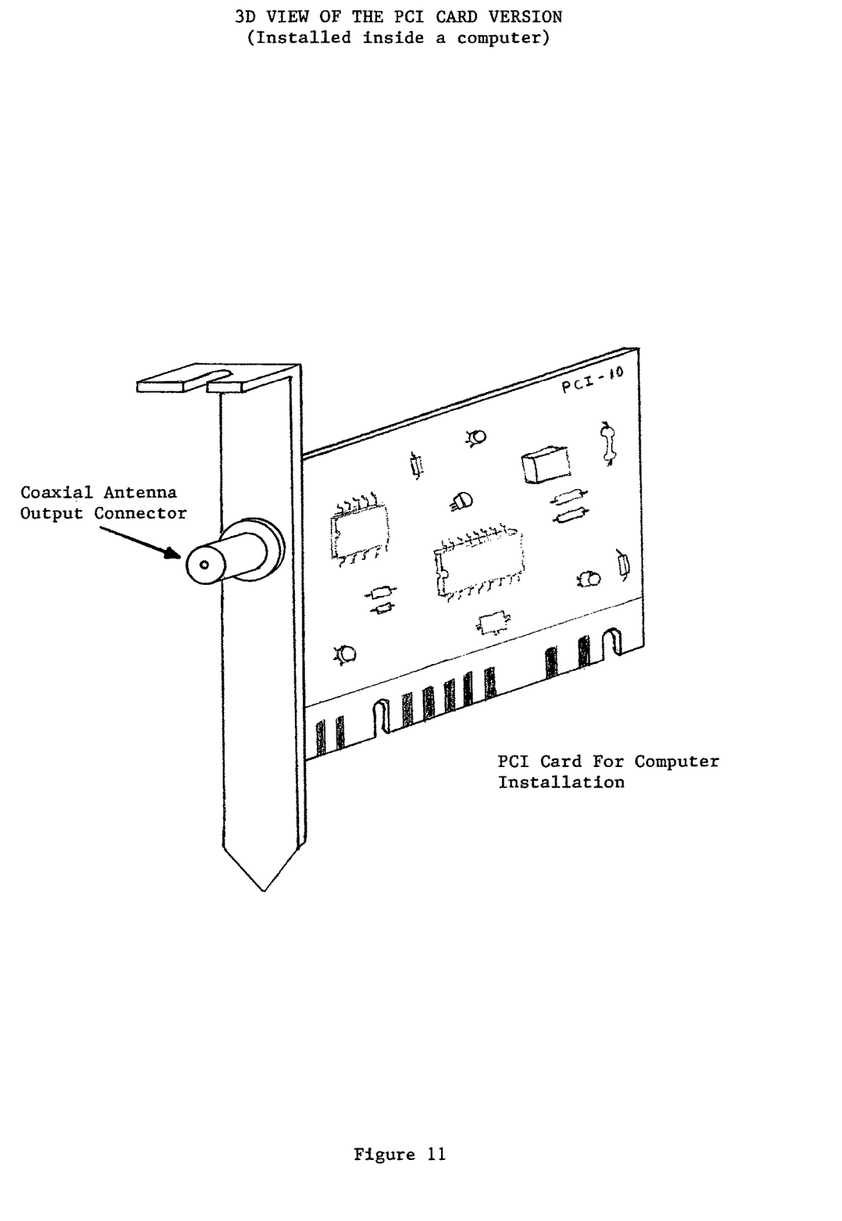
Figure 12:
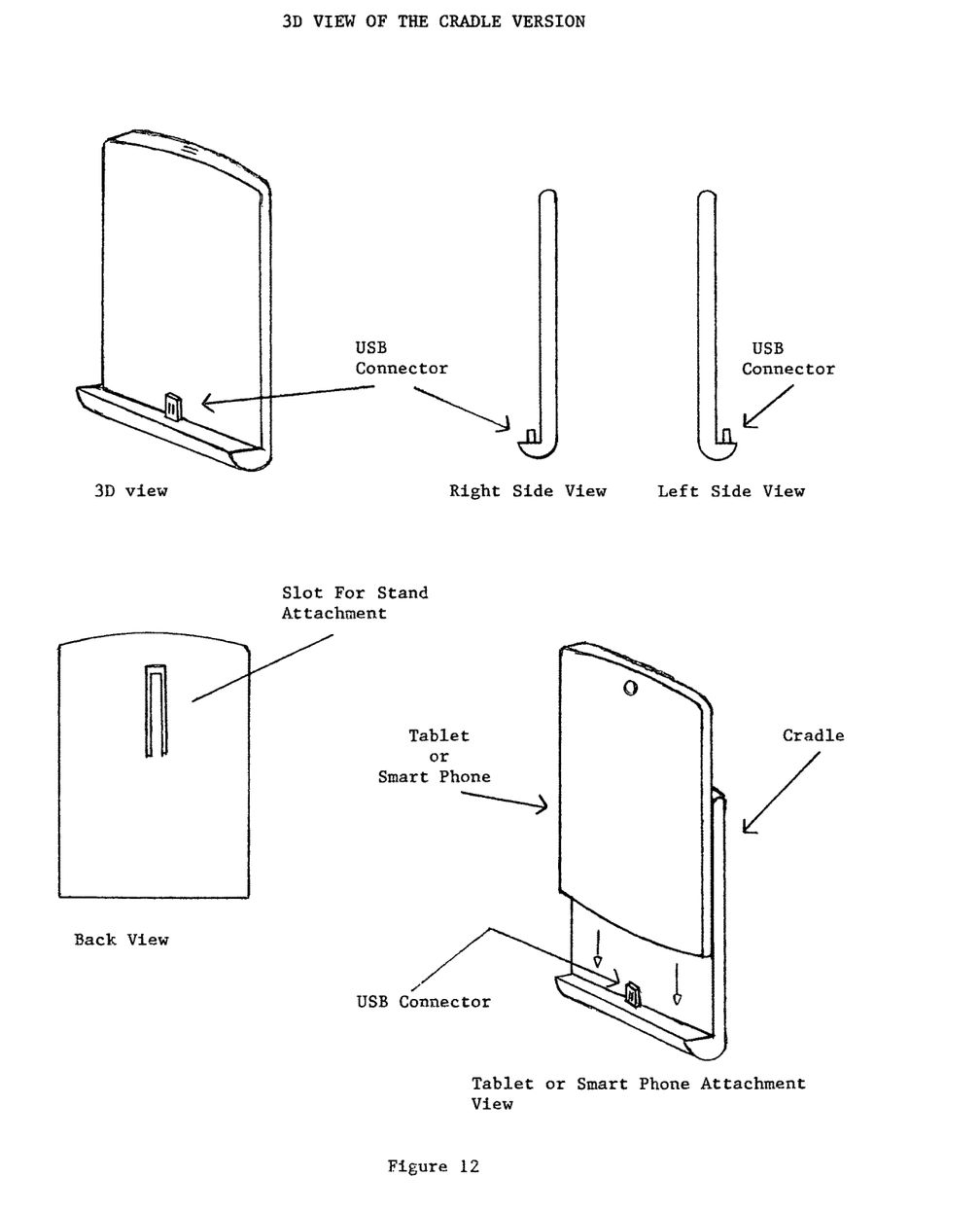
FIG. 12, is the 3D view of the Cradle version of the Invention, used primarily for tablets and large smart phones. Also, Left and Right Side view, Back view, and Attachment view. This figure depicts the Cradle Version of the SCC. A Tablet or Smart Phone may be attached to the Cradle SCC by means of its USB Connector, (other types of connector means may be used as well), this is accomplished by sliding the Tablet or Smart Phone down onto the Cradle SCC, the Cradle SCC's USB Connector will insert into the USB port of the Tablet or Smart phone; once connected, the Cradle SCC will enable the Tablet or Smart phone to transmit and receive satellite communication signals; and enable the Tablet or Smart phone to have two selectable primary communication means, (i.e. cell towers and satellites). Further depicted in the figure is the Back View of the Cradle SCC, which has a Slot for a Stand Attachment. This Stand Attachment means will permit a stand of some type to be secured to the back of the Cradle SCC, once the stand is attached, the Cradle SCC will be able the stand in a tilted upwards position. Also, the antenna means is enclosed within the Cradle SCC's housing and located near the top region for maximum signal transmission and reception, this is depicted by the double lines on the top edge of the 3D view of the Cradle SCC in the figure.

The Satlink Convertor/Communicator (SCC), is a device that converts a regular cell phone, smart phone, tablet, laptop, computer, or any other remote communication device, into a satellite phone or emergency beacon. This is accomplished by inserting the SCC's usb connector into the usb port of the remote communication device; other connector types may be used as well. Once the SCC is connected to the remote communication device, the user may place a satellite phone call, trigger an emergency beacon, access the internet, send emails or text messages, etc. In the event of an emergency and the user triggers the SCC's emergency beacon, the SCC will transmit the GPS coordinates (Latitude and Longitude) of the user, via satellite, to a monitoring service. Further, the SCC can be interfaced to a Base Unit installed within a vehicle, boat, home, or business (fixed locations). The Base Unit enables the SCC to be used inside of a vehicle, boat, home, or business, which normally restricts the use of satellite communication devices.

The SCC may be used to convert and provide a regular cell phone, smart phone, tablet, laptop, computer, or any other remote communication device, satellite internet access for purposes of accessing and communicating with the Worldwide Web (internet) by means of satellite connectivity.

The SCC may be an individual device connects to a regular cell phone, smart phone, tablet, laptop, computer, or any other remote communication device; or the SCC may be a circuit that is incorporated or embedded within the circuitry of a regular cell phone, smart phone, tablet, laptop, or computer, or any other remote communication device; therefore, making these devices satellite accessible devices.

Once the SCC is incorporated or embedded within a regular cell phone, the regular cell phone will have two communication means, cell towers and satellites. Therefore, the user of the regular cell phone may select between these two services.

Once the SCC is incorporated or embedded within a smart phone, tablet, laptop, computer, or any other remote communication device, these devices will have two primary communication means, cell towers and satellites. The software that is provided with the SCC and loaded on the remote communication device, will allow the user to select between the two primary communication means (cell towers and satellites). There may be other (secondary) communication means provided by the SCC circuitry and software program, such as, WiFi, Blue Tooth, etc. that will be incorporated or embedded within these remote communication device. Once the SCC is attached to, incorporated or embedded within a regular cell phone, smart phone, tablet, laptop, computer, or any other remote communication device, these communication devices may directly transmit and receive signals via satellite communications, without the aid of an attached satellite transmitter/receiver.

Once the SCC is attached to, incorporated or embedded within a cell phone, the cell, phone becomes a satellite phone.

Once the SCC is attached to, incorporated or embedded within a smart phone, the smart phone becomes a satellite smart phone.

Once the SCC is attached to, incorporated or embedded within a tablet, the tablet becomes a satellite tablet.

Once the SCC is attached to, incorporated or embedded within a laptop, the laptop become a satellite laptop.

Once the SCC is attached to, incorporated or embedded within a computer, the computer becomes a satellite computer.

Once the SCC is attached to, incorporated or embedded within a remote communication device, the remote communication device will becomes a satellite remote communication device. For the purpose herein, a remote communication device shall mean, any distance, separate, mobile, wireless, or wearable device.

Once the SCC activates, it will connect to a Satellite Monitoring Service (SMS) or Satellite Communication Service Provider (SCSP) that provides the internet access, phone service, or emergency assistance to the user. The user activates the SCC by selecting or starting one of the features of the SCC's software program.

The SCC can be interfaced to a Base Unit that is designed to be installed within a vehicle, boat, home, or business. The interface can be a cable that directly connects the SCC to the Base Unit, or the interface can be a wireless connection means or protocol (WiFi, Blue Tooth, etc.) that connects the SCC to the Base Unit. Once the SCC is connected to the Base Unit installed within a vehicle, boat, home, or business, the Base Unit provides the SCC with outside transmission and reception of the satellite signal. This is accomplished by an antenna mounted on a surface outside of the vehicle, boat, home, or business, with a cable extending from the antenna to the Base Unit installed inside of the vehicle, boat, home, or business; alternatively, the antenna could be mounted or fixed to the internal glass part of the windshield of the vehicle or boat; or the glass part of the windowpane of the home, or business. The satellite signal can then be transmitted or received through the glass part of the windshield or windowpane; therefore, eliminating the need to mount an outside antenna. The satellite signal is then relayed to the SCC by means of a directly connected cable or wireless means, such as, WiFi, Blue Tooth, or any other wireless means.

The SCC can be used as a primary mobile communication means or as a backup/secondary mobile communication means to make phone calls, gain access to the internet, send and receive emails and text messages, or send an emergency beacon to summon help when needed.

Each year, a person is lost in the forest, lost hiking the mountains, lost while traveling through the desert, or lost at sea while cruising in a boat. In each of these situations, regular cell phone communication becomes unavailable, the cell signal simply don't reach to these remote areas. And, in some cases, the person caught in such a predicament is helpless and never found or rescued. The Satlink Convertor/Communicator can provide a solution to such a tragedy by giving the helpless person an alternative means of communication to contact help, or send an emergency beacon to summon help.

We claim:

1. An electronic device comprising:
   (a) An electronic circuit that converts a remote communication device into a satellite remote communication device by altering or converting said remote communication device's normal wireless communication means and frequency into a satellite communication means and frequency, comprising:
      (i) a first electronic integrated circuit for processing input and output wireless signals to and from said remote communication device, and for controlling transmission and reception signal flow by means of a multiplexed signal switch;
      (ii) a second electronic integrated circuit for transforming an analog wireless signal wave into a digital data signal;
      (iii) a third electronic integrated circuit for transforming a digital data signal into an analog wireless signal wave;
      (iv) providing a program for instructing said electronic integrated circuits comprising: a first step for instructing said first electronic integrated circuit to determine if said wireless signal is as input signal or an output signal from said remote communication device; a second step for triggering said first electronic integrated circuit to instruct said multiplexed signal switch based on a determination of an input or output wireless signal from said remote communication device; a step for instructing said second and third electronic integrated circuits to determine if said signal is a wireless analog signal or a digital data signal for transforming said signal;

(b) a connection means to connect said electronic device to said remote communication device comprising:

(i) providing a software program configured to control and instruct said connection means;

c) a satellite antenna means for transmitting the converted or altered frequency of the remote communication device to an orbiting satellite;

(d) a signal strength measuring means to indicate the signal strength of said electronic device and comprising indicator bars and a software program configured to instruct said signal strength measuring means;

(e) a manual beacon activation means comprising a button or icon, that enables easy access for triggering an emergency beacon that is uplinked to an orbiting satellite and relayed back to an earth station for monitoring;

(f) a means to interface said electronic circuit to a base unit for operating within closed facilities and vehicles;

(g) a means for converting half duplexed wireless signals into full duplexed wireless signal transmission;

wherein said electronic device transmits an emergency beacon, along with its GPS coordinates, to a monitoring service via satellite communication.

2. The electronic device of claim 1, wherein said electronic device is a device that attaches to said remote communication device, and said remote communication device is a regular cell phone or smart phone; and said connection means is a Universal Serial Bus connector, cable, and a wireless means.

3. The electronic device of claim 1, wherein said electronic device is a device that attaches to said remote communication device, and said remote communication device is a tablet; and said connection means is a Universal Serial Bus connector, cable, and a wireless means.

4. The electronic device of claim 1, wherein said electronic device is a device that attaches to said remote communication device, and said remote communication device is a laptop; and said connection means is a Universal Serial Bus connector, cable, and a wireless means.

5. The electronic device of claim 1, wherein said electronic device is a device that attaches to said remote communication device, and said remote communication device is a computer; and said connection means is a Universal Serial Bus connector, cable, and a wireless means.

6. The electronic device of claim 1, wherein said electronic device is a device that attaches to said remote communication device, and said remote communication device is a two way radio, or VHF/UHF marine radio; and said connection means is a Universal Serial Bus connector, cable, and a wireless means.

7. The electronic device of claim 1, wherein said electronic device is a circuit that is incorporated or embedded within the circuitry of said remote communication device; and said remote communication device is a regular cell phone; and said connection means is wireless, or incorporated or embedded within the actual circuitry.

8. The electronic device of claim 1, wherein said electronic device is a circuit that is incorporated or embedded within the circuitry of said remote communication device; and said remote communication device is a smart phone; and said connection means is wireless, or incorporated or embedded within the actual circuitry.

9. The electronic device of claim 1, wherein said electronic device is a circuit that is incorporated or embedded within the circuitry of said remote communication device; and said remote communication device is a tablet; and said connection means is wireless, or incorporated or embedded within the actual circuitry.

10. The electronic device of claim 1, wherein said electronic device is a circuit that is incorporated or embedded within the circuitry of said remote communication device; and said remote communication device is a laptop; and said connection means is wireless, or incorporated or embedded within the actual circuitry.

11. The electronic device of claim 1, wherein said electronic device is a circuit that is incorporated or embedded within the circuitry of said remote communication device; and said remote communication device is a computer; and said connection means is wireless, or incorporated or embedded within the actual circuitry.

12. The electronic device of claim 1, wherein said electronic device is a circuit that is incorporated or embedded within the circuitry of said remote communication device; and said remote communication device is a two way radio, or VHF/UHF marine radio, or a wearable communication device; and said connection means is wireless, or incorporated or embedded within the actual circuitry.

13. The electronic device of claim 1, wherein said electronic device also provides a secondary wireless communication means.

14. The electronic device of claim 1, wherein said electronic device is a Base Unit that is installed in a vehicle, boat, home, or business; and said connection means is a cable means or wireless means; and said Base Unit will enable said remote communication device to operate within a vehicle, boat, home, or business.

15. The electronic device of claim 1, wherein said electronic device is programmed with software, utility files, or drivers, to perform the functions or features of said electronic device.

* * * * *